US012632747B2

(12) United States Patent
Zhang et al.

(10) Patent No.: US 12,632,747 B2
(45) Date of Patent: May 19, 2026

(54) TRAINING A KNOWLEDGE GRAPH ALIGNMENT MODEL BASED ON PREDICTED ALIGNMENT PROBABILITIES AND ALIGNMENT DIFFICULTY DEGREES OF ENTITY PAIRS

(71) Applicant: Tencent Technology (Shenzhen) Company Limited, Shenzhen (CN)

(72) Inventors: Ziheng Zhang, Shenzhen (CN); Zhiyuan Qi, Shenzhen (CN); Shengzhang Lai, Shenzhen (CN); Xi Chen, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 741 days.

(21) Appl. No.: 17/991,602

(22) Filed: Nov. 21, 2022

(65) Prior Publication Data

US 2023/0100772 A1     Mar. 30, 2023

Related U.S. Application Data

(63) Continuation of application No. PCT/CN2022/090303, filed on Apr. 29, 2022.

(30) Foreign Application Priority Data

May 18, 2021     (CN) .......................... 202110539698.4

(51) Int. Cl.
*G06N 5/02* (2023.01)
*G06F 40/30* (2020.01)
*G06N 5/022* (2023.01)
(52) U.S. Cl.
CPC ............. *G06N 5/022* (2013.01); *G06F 40/30* (2020.01)

(58) Field of Classification Search
CPC ........ G06N 5/022; G06N 3/0464; G06N 3/09; G06N 20/00; G06F 40/30; G06F 16/367; G06F 40/194
See application file for complete search history.

(56) References Cited

FOREIGN PATENT DOCUMENTS

CN        108647318 A        10/2018
CN        109960810 A        7/2019
(Continued)

OTHER PUBLICATIONS

International Search Report and Written Opinion received for PCT Patent Application No. PCT/CN2022/090303, mailed on Jul. 28, 2022, 14 pages (7 pages of English Translation and 7 pages of Original Document).

(Continued)

*Primary Examiner* — Masud K Khan
(74) *Attorney, Agent, or Firm* — ARENTFOX SCHIFF LLP

(57) ABSTRACT

A method for training a knowledge graph alignment model includes selecting first candidate entity pairs from first entity pairs based on a predicted alignment probability of each of the first entity pairs, and calculating an alignment difficulty degree of each of the first candidate entity pairs. The method further includes selecting first target entity pairs from the first candidate entity pairs based on the alignment difficulty degree of each of the first candidate entity pairs, acquiring a labeled alignment result of each of the first target entity pairs, and obtaining a trained knowledge graph alignment model according to the predicted alignment probability and the labeled alignment result of each of the first target entity pairs.

20 Claims, 6 Drawing Sheets

(56)            References Cited

FOREIGN PATENT DOCUMENTS

| | | | | |
|---|---|---|---|---|
| CN | 110941722 A | * | 3/2020 | ............. G06N 3/045 |
| CN | 112966124 A | | 6/2021 | |

OTHER PUBLICATIONS

Office Action received for Chinese Patent Application No. 202110539698.4, mailed on Jun. 23, 2021.

* cited by examiner

11

| Sequential number | Entity in first knowledge graph | Entity in second knowledge graph | Alignment or not |
|---|---|---|---|
| 6 | Link information 6a | Link information 6b | ◉ Alignment ○ Misalignment |
| 7 | Link information 7a | Link information 7b | ◉ Alignment ○ Misalignment |
| 8 | Link information 8a | Link information 8b | ○ Alignment ◉ Misalignment |
| 9 | Link information 9a | Link information 9b | ◉ Alignment ○ Misalignment |
| 10 | Link information 10a | Link information 10b | ◉ Alignment ○ Misalignment |

FIG. 4

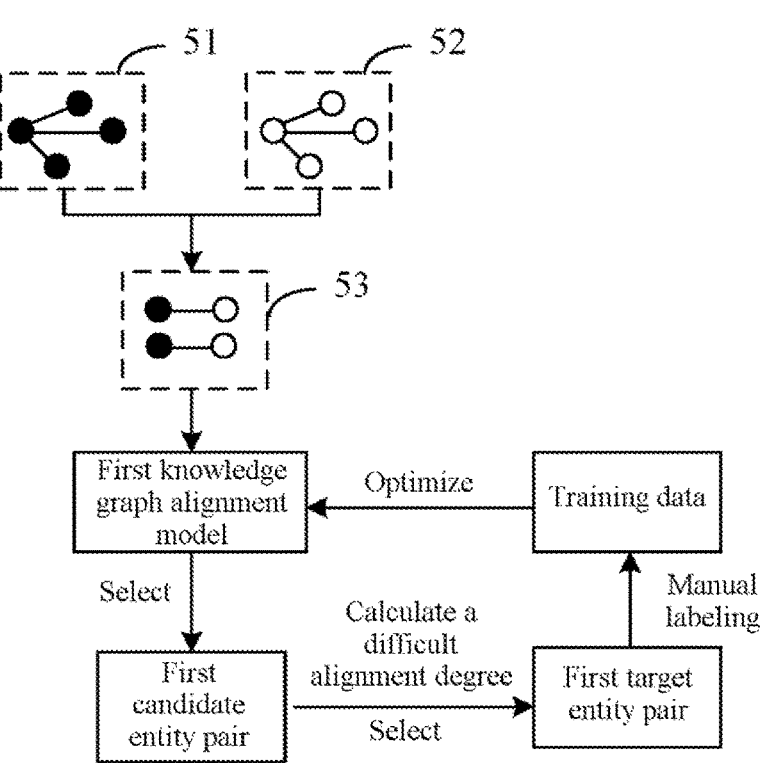

FIG. 5

| Model | First training | | Second training | | Third training | |
|---|---|---|---|---|---|---|
| | F1 score | Manual labeling amount | F1 score | Manual labeling amount | F1 score | Manual labeling amount |
| Multi-view knowledge graph embedding for entity alignment (MultiKE) | 0.896 | 1000 | 0.923 | 400 | 0.927 | 50 |
| Cross-lingual knowledge graph alignment via graph convolutional networks (GCNAlign) | 0.895 | 1200 | 0.903 | 300 | 0.904 | 30 |

FIG. 6

TRAINING A KNOWLEDGE GRAPH ALIGNMENT MODEL BASED ON PREDICTED ALIGNMENT PROBABILITIES AND ALIGNMENT DIFFICULTY DEGREES OF ENTITY PAIRS

RELATED APPLICATIONS

This application is a continuation of International Application No. PCT/CN2022/090303, filed on Apr. 29, 2022, which claims priority to Chinese Patent Application No. 202110539698.4, entitled "METHOD AND APPARATUS FOR TRAINING KNOWLEDGE GRAPH ALIGNMENT MODEL, KNOWLEDGE GRAPH ALIGNMENT METHOD AND APPARATUS, AND DEVICE" and filed on May 18, 2021. The entire disclosures of the prior applications are hereby incorporated by reference.

FIELD OF THE TECHNOLOGY

Embodiments of this application relate to the fields of artificial intelligence (AI) and cloud technology, including a method and apparatus for training a knowledge graph alignment model, a knowledge graph alignment method and apparatus, and a device.

BACKGROUND OF THE DISCLOSURE

A knowledge graph is composed of interconnected entities and relationships between entities, and a knowledge graph alignment technology is of great significance to build a large-scale and high-quality knowledge graph. In general, entities in two knowledge graphs are aligned based on a trained knowledge graph alignment model to introduce the content of other knowledge graphs into one knowledge graph, so as to integrate knowledge graphs with different granularities and different vertical domains.

In the related art, two knowledge graphs are acquired in advance. Any one of the entities in one knowledge graph and any one of the entities in the other knowledge graph are manually aligned and labeled. In this way, the entities in the two knowledge graphs are aligned and labeled. The labeled knowledge graphs are determined as a training data set. A knowledge graph alignment model is obtained by training based on the training data set so as to perform entity alignment based on the knowledge graph alignment model.

In the above-mentioned manner, the number of training data sets is very large, and it takes a lot of time to manually label the entity pairs of the training data sets, which affects the model training speed and thus affects the alignment efficiency.

SUMMARY

Embodiments of this disclosure provide a method and apparatus for training a knowledge graph alignment model, a knowledge graph alignment method and apparatus, and a device, which can be used for increasing the model training speed and improve the alignment efficiency. In an embodiment, a method for training a knowledge graph alignment model includes acquiring a first entity pair set, the first entity pair set comprising a plurality of first entity pairs, each of the first entity pairs comprising an entity in a first knowledge graph and an entity in a second knowledge graph and having an unlabeled alignment relationship between the entity in the first knowledge graph and the entity in the second knowledge graph. The method further includes selecting a plurality of first candidate entity pairs from the first entity pairs based on a predicted alignment probability of each of the first entity pairs, and calculating an alignment difficulty degree of each of the first candidate entity pairs. The alignment difficulty degree of the respective ones of the first candidate entity pairs indicates a degree of difficulty in aligning the respective first candidate entity pair. The method further includes selecting a plurality of first target entity pairs from the first candidate entity pairs based on the alignment difficulty degree of each of the first candidate entity pairs, acquiring a labeled alignment result of each of the first target entity pairs, and obtaining a trained knowledge graph alignment model according to the predicted alignment probability and the labeled alignment result of each of the first target entity pairs.

In an embodiment, an apparatus for training a knowledge graph alignment model includes processing circuitry configured to acquire a first entity pair set, the first entity pair set comprising a plurality of first entity pairs, each of the first entity pairs comprising an entity in a first knowledge graph and an entity in a second knowledge graph and having an unlabeled alignment relationship between the entity in the first knowledge graph and the entity in the second knowledge graph. The processing circuitry is further configured to select a plurality of first candidate entity pairs from the first entity pairs based on a predicted alignment probability of each of the first entity pairs, and calculate an alignment difficulty degree of each of the first candidate entity pairs. The alignment difficulty degree of the respective ones of the first candidate entity pairs indicates a degree of difficulty in aligning the respective first candidate entity pair. The processing circuitry is further configured to select a plurality of first target entity pairs from the first candidate entity pairs based on the alignment difficulty degree of each of the first candidate entity pairs, acquire a labeled alignment result of each of the first target entity pairs, and obtain a trained knowledge graph alignment model according to the predicted alignment probability and the labeled alignment result of each of the first target entity pairs.

In an embodiment a non-transitory computer-readable storage medium stores computer-readable instructions thereon, which, when executed by processing circuitry, cause the processing circuitry to perform a method for training a knowledge graph alignment model. The method includes acquiring a first entity pair set, the first entity pair set comprising a plurality of first entity pairs, each of the first entity pairs comprising an entity in a first knowledge graph and an entity in a second knowledge graph and having an unlabeled alignment relationship between the entity in the first knowledge graph and the entity in the second knowledge graph. The method further includes selecting a plurality of first candidate entity pairs from the first entity pairs based on a predicted alignment probability of each of the first entity pairs, and calculating an alignment difficulty degree of each of the first candidate entity pairs. The alignment difficulty degree of the respective ones of the first candidate entity pairs indicates a degree of difficulty in aligning the respective first candidate entity pair. The method further includes selecting a plurality of first target entity pairs from the first candidate entity pairs based on the alignment difficulty degree of each of the first candidate entity pairs, acquiring a labeled alignment result of each of the first target entity pairs, and obtaining a trained knowledge graph alignment model according to the predicted alignment probability and the labeled alignment result of each of the first target entity pairs.

According to the technical solutions provided by the embodiments of this disclosure, a plurality of first candidate entity pairs are preliminarily selected from first entity pairs based on predicted alignment probabilities of the first entity pairs, first target entity pairs are then selected from the first candidate entity pairs based on a difficult alignment degree (alignment difficulty degree) of each of the first candidate entity pairs, and labeled alignment results of the first target entity pairs are acquired to obtain a target knowledge graph alignment model through the predicted alignment probabilities and the labeled alignment results of the first target entity pairs. The number of entity pairs needing to be labeled is greatly reduced by selecting twice, thereby saving the time cost, increasing the model training speed, and improving the alignment efficiency. Furthermore, the predicted alignment probabilities and the difficult alignment degrees are considered respectively during selection twice, which is beneficial to ensure the training reliability of a first target entity selected, thus ensuring the model training effect and the alignment performance.

BRIEF DESCRIPTION OF THE DRAWINGS

FIG. 4 is a display diagram of a labeling interaction interface according to embodiments of this disclosure.

FIG. 5 is a training diagram of a knowledge graph alignment model according to embodiments of this disclosure.

FIG. 6 is a training effect diagram of a knowledge graph alignment model according to embodiments of this disclosure.

DESCRIPTION OF EMBODIMENTS

To make objectives, technical solutions, and advantages of this disclosure clearer, the following further describes in detail implementations of this disclosure with reference to the accompanying drawings.

Figure 1:
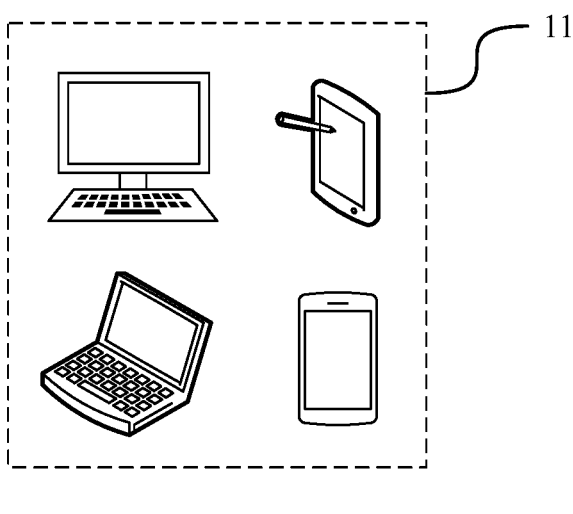
FIG. 1 is a schematic diagram of an implementation environment of a method for training a knowledge graph alignment model or a knowledge graph alignment method according to embodiments of this disclosure.

FIG. 1 is a schematic diagram of an implementation environment of a method for training a knowledge graph alignment model or a knowledge graph alignment method according to embodiments of this disclosure. As shown in FIG. 1, the implementation environment includes an electronic device 11. The method for training a knowledge graph alignment model or the knowledge graph alignment method in the embodiments of this disclosure may be performed by the electronic device 11. Illustratively, the electronic device 11 may include at least one of a terminal device or a server.

The terminal device may be at least one of a smartphone, a game console, a desktop computer, a tablet computer, and a laptop portable computer.

The server may be one server, a server cluster including a plurality of servers, or any one of a cloud computing platform and a virtualization center. This is not limited in this embodiment of this disclosure. The server may communicate with the terminal device through a wired or wireless network. The server may have functions of data processing, data storage and data transceiving, which are not limited in the embodiments of this disclosure.

The method for training a knowledge graph alignment model or the knowledge graph alignment method according to the embodiments of this disclosure may be implemented based on an AI technology.

Data involved in the method for training a knowledge graph alignment model or the knowledge graph alignment method according to the embodiments of this disclosure may be implemented based on cloud technology, data processing/data computing involved in the implementation of the solutions may be realized based on cloud computing, and data involved in the implementation of the solutions may be saved on a blockchain.

Figure 2:
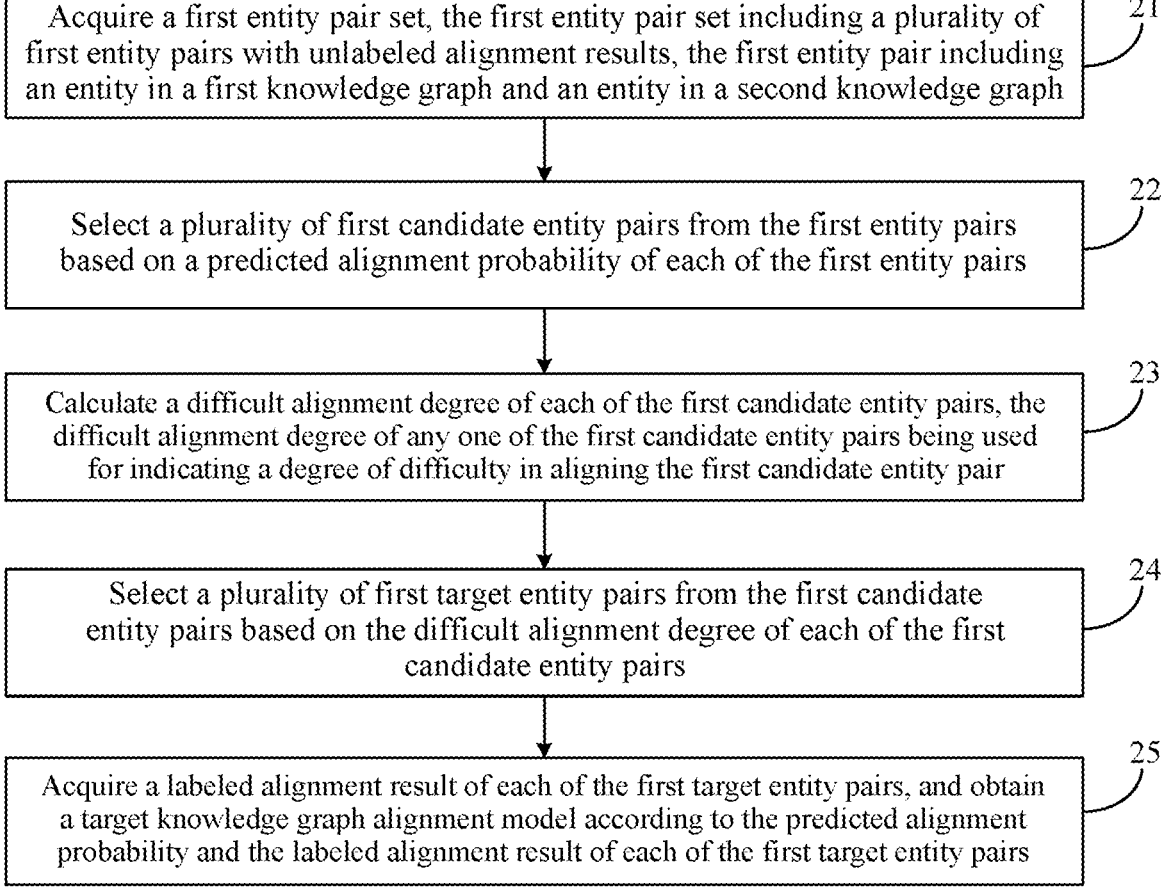
FIG. 2 is a flowchart of a method for training a knowledge graph alignment model according to embodiments of this disclosure.

Based on the implementation environment as shown in FIG. 1, embodiments of this disclosure provide a method for training a knowledge graph alignment model, which may be performed by the electronic device 11 in FIG. 1 by taking a flowchart of a method for training a knowledge graph alignment model according to embodiments of this disclosure shown in FIG. 2 as an example. For convenience of understanding, terms related in the embodiments of this disclosure are introduced and described below.

Entities are things that exist objectively and are distinguishable from each other. For example, the entities include, but are not limited to, cats, dogs, etc. In the embodiments of this disclosure, entities are basic units of a knowledge graph, and are important units bearing information in the knowledge graph.

The knowledge graph is composed of interconnected entities and relationships between entities. That is to say, the knowledge graph is composed of pieces of knowledge which are a subject-predicate-object (SPO) triplet respectively, nodes in the knowledge graph are subjects or objects, and edges are predicates between the subjects and the objects.

Knowledge graph alignment, also known as entity alignment, aims to determine whether entities in two or more different knowledge graphs are directed to the same object in the real world, and if a plurality of entities are directed to the same object, an alignment relationship is constructed between these entities.

As shown in FIG. 2, the method for training a knowledge graph alignment model according to the embodiments of this disclosure includes steps 21-25.

Step 21: Acquire a first entity pair set, the first entity pair set including a plurality of first entity pairs with unlabeled alignment results, the first entity pair including an entity in a first knowledge graph and an entity in a second knowledge graph. For example, a first entity pair set is acquired. The first entity pair set includes a plurality of first entity pairs, each of the first entity pairs includes an entity in a first knowledge graph and an entity in a second knowledge graph and having an unlabeled alignment relationship between the entity in the first knowledge graph and the entity in the second knowledge graph.

The first knowledge graph and the second knowledge graph are different knowledge graphs having sizes, contents, etc. not limited in the embodiments of this disclosure. For example, the first knowledge graph and the second knowledge graph are both knowledge graphs related to medicine.

A first entity pair is constructed based on one entity (subject or object) in the first knowledge graph and one entity (subject or object) in the second knowledge graph. Since both the first knowledge graph and the second knowledge graph include at least one SPO triplet, i.e. both the first knowledge graph and the second knowledge graph include at least two entities, a plurality of first entity pairs may be constructed, so as to obtain a first entity pair set including the plurality of first entity pairs with unlabeled alignment results. When a plurality of first entity pairs are constructed, the embodiments of this disclosure do not limit the manner in which the first knowledge graph and the second knowledge graph are acquired, related knowledge graphs may be acquired based on an application scenario or training requirement, and then entities in two knowledge graphs are acquired to construct a plurality of first entity pairs.

Step 22: Select a plurality of first candidate entity pairs from the first entity pairs based on a predicted alignment probability of each of the first entity pairs.

For any one of the first entity pairs, the predicted alignment probability of the first entity pair may be determined based on a first knowledge graph alignment model. Illustratively, the first knowledge graph alignment model may be a trained alignment model. The structure of the first knowledge graph alignment model is not limited in the embodiments of this disclosure. For example, the first knowledge graph alignment model may be a knowledge graph alignment model obtained before this training using the method provided in this embodiment. Illustratively, the first knowledge graph alignment model may also be an initialized alignment model.

Furthermore, in addition to using the trained alignment model or the initialized alignment model to acquire the predicted alignment probability of the first entity pair, the predicted alignment probability of the first entity pairs may be calculated according to a formula, and the formula of calculating the predicted alignment probability is not limited.

In a possible implementation, based on the predicted alignment probability of each of the first entity pairs, a predicted alignment probability greater than or equal to a first alignment probability and less than or equal to a second alignment probability is selected from the predicted alignment probability of each of the first entity pairs, and a first entity pair corresponding to the selected predicted alignment probability is determined as a first candidate entity pair. The first alignment probability is less than or equal to the second alignment probability, and the sizes of the first alignment probability and the second alignment probability will not be limited in the embodiments of this disclosure, may be set from experience or based on application scenarios, and may also be adjusted according to actual situations.

In an exemplary embodiment, if the predicted alignment probability of any one of the first entity pairs is less than the first alignment probability, it indicates that the first entity pair is misaligned with a high probability, and it may be considered that the first entity pair is misaligned. If the predicted alignment probability of any one of the first entity pairs is greater than the second alignment probability, it indicates that the first entity pair is aligned with a high probability, and it may be considered that the first entity pair is aligned. A predicted alignment probability greater than or equal to the first alignment probability and less than or equal to the second alignment probability is selected. An alignment probability of a first candidate entity pair corresponding to the selected predicted alignment probability is similar to a misalignment probability. A training sample for training a target knowledge graph alignment model is selected from the first candidate entity pair. Thus, the number of training samples manually labeled can be reduced, the labeling time can be shortened, the model training speed can be increased, the alignment efficiency can be improved, and the model alignment effect can also be ensured.

Step 23: Calculate a difficult alignment degree of each of the first candidate entity pairs, the difficult alignment degree of any one of the first candidate entity pairs being used for indicating a degree of difficulty in aligning the first candidate entity pair. For example, an alignment difficulty degree of each of the first candidate entity pairs is calculated, the alignment difficulty degree of the respective ones of the first candidate entity pairs indicating a degree of difficulty in aligning the respective first candidate entity pair.

In an exemplary embodiment, for any one of the first candidate entity pairs, the difficult alignment degree of the first candidate entity pair is calculated according to at least one of a character similarity, a semantic similarity, an entity attribute proportion, a triplet proportion, and a weight of the first candidate entity pair.

For convenience of description and explanation, the manner of calculating the difficult alignment degree will be described below in detail from the perspective of one piece of information (any one of the character similarity, the semantic similarity, the entity attribute proportion, the triplet proportion, and the weight). In a case where at least two pieces of information are used when calculating the difficult alignment degree, the manners provided in the embodiments of this disclosure may be combined and calculated, and will not be described in detail in the embodiments of this disclosure.

In a possible implementation of the embodiments of this disclosure, the operation of calculating a difficult alignment degree of each of the first candidate entity pairs includes: calculating, for any one of the first candidate entity pairs, a character similarity of the first candidate entity pair based on character features of the entities in the first candidate entity pair; and determining the difficult alignment degree of the first candidate entity pair based on the character similarity.

Illustratively, a name likeness (i.e. character similarity) of an entity is closely related to the alignment efficiency of a knowledge graph alignment model. If two names of an entity are the same or similar, the knowledge graph alignment model is likely to determine the two names as an entity, i.e. likely to align the two names. If the two names differ greatly, the knowledge graph alignment model is likely to determine the two names as two different entities, i.e. unlikely to align the two names.

Based on the above-mentioned characteristics, when calculating the difficult alignment degree of the first candidate entity pair in the embodiments of this disclosure, a training sample for a target knowledge graph alignment model is selected from the first candidate entity pair based on the difficult alignment degree of the first candidate entity pair in overall consideration of the character similarity of the first candidate entity pair, thereby improving the performance and recall rate of the model.

In an exemplary embodiment, for any one of the entities in any one of the first candidate entity pairs, the entity includes at least one character, and character features of the characters in the entity are determined. If the entity includes one character, character features of the character are determined as the character features of the entity. If the entity includes at least two characters, character features of the characters in the entity are concatenated in sequence, and the concatenated character features are determined as the character features of the entity.

For any one of the first candidate entity pairs, a character similarity of the first candidate entity pair is calculated according to character features of the entities in the first candidate entity pair, and a difficult alignment degree of the first candidate entity pair is calculated according to the character similarity of the first candidate entity pair. Illustratively, the process may be represented by the following Equation 1.

$$P_1 \alpha (1 - edit(str(e_1(i), str(e_2(i)))) \qquad \text{(Equation 1)}$$

Where $P_1$ represents a difficult alignment degree of an $i^{th}$ first candidate entity pair, a represents a first weight, the value of the first weight is obtained from artificial experience or by calculation, and the manner of calculating the first weight is not limited. $edit(str(e_1(i)), str(e_2(i)))$ represents a character similarity (which may also be referred to as a character string edit distance) of the $i^{th}$ first candidate entity pair, where $str(e_1(i))$ represents a character feature of a first entity $e_1(i)$ in the $i^{th}$ first candidate entity pair, and $str(e_2(i))$ represents a character feature of a second entity $e_2(i)$ in the $i^{th}$ first candidate entity pair.

In an exemplary embodiment, the value of the character string edit distance is greater than or equal to 0, and is less than or equal to 1. A larger value of the character string edit distance represents more similar names of the two entities in the first candidate entity pair. Through $1 - edit(str(e_1(i)), str(e_2(i)))$, the names of the two entities in the first candidate entity pair are more dissimilar, and the value of the difficult alignment degree of the first candidate entity pair is larger. A training sample for a target knowledge graph alignment model is selected from the first candidate entity pair based on the difficult alignment degree of the first candidate entity pair, so that the model trained according to the training sample has a better performance and higher recall rate.

In another possible implementation of the embodiments of this disclosure, the operation of calculating a difficult alignment degree of each of the first candidate entity pairs includes: calculating, for any one of the first candidate entity pairs, a semantic similarity of the first candidate entity pair based on semantic features of the entities in the first candidate entity pair; and determining the difficult alignment degree of the first candidate entity pair based on the semantic similarity.

The semantic likeness of an entity pair is closely related to the alignment efficiency of the knowledge graph alignment model. The semantic likeness of the entity pair is represented by the semantic similarity of the entity pairs, and the value of the semantic similarity is greater than or equal to 0 and less than or equal to 1. For an entity pair, if the value of the semantic similarity of the entity pair is larger, it indicates that semantics of two entities in the entity pair are more similar, and the model is more likely to determine the two entities as an entity, i.e. more likely to align the two entities. If the value of the semantic similarity of the entity pair is smaller, it indicates that semantics of two entities in the entity pair are more dissimilar, and the model is more unlikely to determine the two entities as an entity, i.e. more unlikely to align the two entities. If the value of the semantic similarity of the entity pair is about 0.5, there will be a great uncertainty when the model determines whether the two entities of the entity pair are the same entity.

Based on the above-mentioned characteristics, when calculating the difficult alignment degree of the first candidate entity pair in the embodiments of this disclosure, a training sample for a target knowledge graph alignment model is selected from the first candidate entity pair based on the difficult alignment degree of the first candidate entity pair in overall consideration of the semantic similarity of the first candidate entity pair, thereby improving the alignment accuracy of the model.

In an exemplary embodiment, for any one of the entities in any one of the first candidate entity pairs, the entity includes at least one character, and character features of the characters in the entity are determined. If the entity includes one character, character features of the character are determined as semantic features of the entity. If the entity includes at least two characters, the semantic features of the entity are determined according to the character features of the characters in the entity, position features of the characters, and an association relationship between the characters, etc.

For any one of the first candidate entity pairs, a semantic similarity of the first candidate entity pair is calculated according to semantic features of the entities in the first candidate entity pair, and a difficult alignment degree of the first candidate entity pair is calculated according to the semantic similarity of the first candidate entity pair. Illustratively, the process may be represented by the following Equation 2.

$$P_2 = 0.1 / |\cos(e_i(i), e_2(i)) - 0.5| \qquad \text{(Equation 2)}$$

where $P_2$ represents a difficult alignment degree of an $i^{th}$ first candidate entity pair. $\cos(e_i(i), e_2(i))$ represents a semantic similarity of the $i^{th}$ first candidate entity pair, where $e_i(i)$ represents a semantic feature of a first entity $e_i(i)$ in the $i^{th}$ first candidate entity pair, and $e_2(i)$ represents a semantic feature of a second entity $e_2(i)$ in the $i^{th}$ first candidate entity pair.

In another possible implementation of the embodiments of this disclosure, the operation of calculating a difficult alignment degree of each of the first candidate entity pairs includes: calculating, for any one of the first candidate entity pairs, an entity attribute proportion of the first candidate entity pair based on the number of entity attributes of the first candidate entity pair, the number of entity attributes of the first knowledge graph and the number of entity attributes of the second knowledge graph; and determining the difficult alignment degree of the first candidate entity pair based on the entity attribute proportion.

Any one of the entities in a knowledge graph correspondingly has entity attributes. The entity attributes may also be referred to as key-value. For example, when the entity is a person, the entity attributes may be a height and a height value. The number of entity attributes of an entity determines the information richness of the entity, and the knowledge graph alignment model is more likely to perform entity alignment for an entity pair with a higher information richness. That is, as the number of entity attributes of an entity pair is larger, the knowledge graph alignment model is more likely to determine whether the entity pair is the same entity.

Based on the above-mentioned characteristics, when calculating the difficult alignment degree of the first candidate entity pair in the embodiments of this disclosure, a training sample for a target knowledge graph alignment model is selected from the first candidate entity pair based on the difficult alignment degree of the first candidate entity pair in overall consideration of the entity attribute proportion of the first candidate entity pair, thereby improving the performance and recall rate of the model.

In an exemplary embodiment, for any one of the first candidate entity pairs, the sum of the numbers of entity attributes of two entities in the first candidate entity pair is calculated to obtain a calculation result serving as the number of entity attributes of the first candidate entity pair. For a first knowledge graph, the sum of the numbers of entity attributes of the entities in the first knowledge graph is calculated to obtain a calculation result serving as the number of entity attributes of the first knowledge graph. For a second knowledge graph, the sum of the numbers of entity attributes of the entities in the second knowledge graph is calculated to obtain a calculation result serving as the number of entity attributes of the second knowledge graph.

The sum of the number of entity attributes of the first knowledge graph and the number of entity attributes of the second knowledge graph is calculated. The ratio of the number of entity attributes of any one of the first candidate entity pairs to the sum of numbers is determined as an entity attribute proportion of the first candidate entity pair. A difficult alignment degree of the first candidate entity pair is calculated based on the entity attribute proportion of the first candidate entity pair. Illustratively, the process may be represented by the following Equation 3.

$$P_3 = \beta \times 1 - (\text{attr}(e_i(i)) + \text{attr}(e_2(i)))/(\text{count}(A_1) + \text{count}(A_2))) \qquad \text{(Equation 3)}$$

where $P_3$ represents a difficult alignment degree of an $i^{th}$ first candidate entity pair, $\beta$ represents a second weight, the value of the second weight is obtained from artificial experience or by calculation, and the manner of calculating the second weight is not limited. $\text{attr}(e_1(i)) + \text{attr}(e_2(i))$ represents the number of entity attributes of the $i^{th}$ first candidate entity pair, where $\text{attr}(e_i(i))$ represents the number of entity attributes of a first entity $e_i(i)$ in the $i^{th}$ first candidate entity pair, $\text{attr}(e_2(i))$ represents the number of entity attributes of a second entity $e_2(i)$ in the $i^{th}$ first candidate entity pair, count $(A_1)$ represents the number of entity attributes of a first knowledge graph, and $\text{count}(A_2)$ represents the number of entity attributes of a second knowledge graph.

In another possible implementation of the embodiments of this disclosure, the operation of calculating a difficult alignment degree of each of the first candidate entity pairs includes: calculating, for any one of the first candidate entity pairs, a triplet proportion of the first candidate entity pair based on the number of triplets of the entities in the first candidate entity pair, the number of triplets of the entities in the first knowledge graph and the number of triplets of the entities in the second knowledge graph; and determining the difficult alignment degree of the first candidate entity pair based on the triplet proportion.

Any one of the entities in a knowledge graph correspondingly has SPO triplets. The number of SPO triplets of an entity determines the information richness of the entity, and the knowledge graph alignment model is more likely to perform entity alignment for an entity pair with a higher information richness. That is to say, as the number of SPO triplets of an entity pair is larger, the knowledge graph alignment model is more likely to determine whether the entity pair is the same entity.

Based on the above-mentioned characteristics, when calculating the difficult alignment degree of the first candidate entity pair in the embodiments of this disclosure, a training sample for a target knowledge graph alignment model is selected from the first candidate entity pair based on the difficult alignment degree of the first candidate entity pair in overall consideration of the triplet proportion of the first candidate entity pair, thereby improving the performance and recall rate of the model.

In an exemplary embodiment, for any one of the first candidate entity pairs, the sum of the numbers of triplets of two entities in the first candidate entity pair is calculated to obtain a calculation result serving as the number of triplets of the first candidate entity pair. For a first knowledge graph, the sum of the numbers of triplets of the entities in the first knowledge graph is calculated to obtain a calculation result serving as the number of triplets of the first knowledge graph. For a second knowledge graph, the sum of the numbers of triplets of the entities in the second knowledge graph is calculated to obtain a calculation result serving as the number of triplets of the second knowledge graph. The sum of the number of triplets of the first knowledge graph and the number of triplets of the second knowledge graph is calculated. The ratio of the number of triplets of any one of the first candidate entity pairs to the sum of numbers is determined as a triplet proportion of the first candidate entity pair. A difficult alignment degree of the first candidate entity pair is calculated based on the triplet proportion of the first candidate entity pair. Illustratively, the process may be represented by the following Equation 4.

$$P_4 = \gamma \times (1 - (\deg(e_1(i)) + \deg(e_2(i)))/(\text{count}(T_1) + \text{count}(T_2))) \qquad \text{(Equation 4)}$$

where $P_4$ represents a difficult alignment degree of an $i^{th}$ first candidate entity pair, $\gamma$ represents a third weight, the value of the third weight is obtained from artificial experience or by calculation, and the manner of calculating the third weight is not limited. $\deg(e_1(i)) + \deg(e_2(i))$ represents the number of triplets of the $i^{th}$ first candidate entity pair, where $\deg(e_1(i))$ represents the number of triplets of a first entity $e_1(i)$ in the $i^{th}$ first candidate entity pair, $\deg(e_2(i))$ represents the number of triplets of a second entity $e_2(i)$ in the $i^{th}$ first candidate entity pair, $\text{count}(T_1)$ represents the number of triplets of a first knowledge graph, and $\text{count}(T_2)$ represents the number of triplets of a second knowledge graph.

In another possible implementation of the embodiments of this disclosure, the operation of calculating a difficult alignment degree of each of the first candidate entity pairs includes: determining, for any one of the first candidate entity pairs, a weight of an entity in the first knowledge graph of the first candidate entity pair based on the number of triplets of the entities in the first knowledge graph, and determining a weight of an entity in the second knowledge graph of the first candidate entity pair based on the number of triplets of the entities in the second knowledge graph; calculating a weight of the first candidate entity pair based on the weight of the entity in the first knowledge graph and the weight of the entity in the second knowledge graph in the first candidate entity pair; and calculating the difficult alignment degree of the first candidate entity pair based on the weight of the first candidate entity pair.

Illustratively, an entity in a first knowledge graph included in any one of the candidate entity pairs is referred to as a first entity, and an entity in a second knowledge graph included in the candidate entity pair is referred to as a second entity. Then the process of determining a difficult alignment degree of any one of the candidate entities includes: determining a weight of the first entity based on the number of triplets of the entities in the first knowledge graph, and determining a weight of the second entity based on the number of triplets of the entities in the second knowledge graph; calculate a weight of the first candidate entity pair based on the weight of the first entity and the weight of the second entity; and calculating the difficult alignment degree of the first candidate entity pair based on the weight of the first candidate entity pair.

In an exemplary embodiment, for a knowledge graph (including but not limited to a first knowledge graph and a second knowledge graph), a weight of each of the entities in the knowledge graph is determined according to the number of triplets of the entities in the knowledge graph.

In a possible implementation, the process of determining a weight of each of the entities in the knowledge graph according to the number of triplets of the entities in the knowledge graph is performed through multiple cycles. In an $N^{th}$ cycle (N is a positive integer greater than or equal to 1), an entity with the largest number of triplets in the current knowledge graph is determined, the entity is denoted as an $N^{th}$ entity, and the $N^{th}$ entity and the triplets of the $N^{th}$ entity in the knowledge graph are deleted. If there are triplets in the deleted knowledge graph, the deleted knowledge graph is determined as a knowledge graph of the next cycle, and the process proceeds to an $(N+1)^{th}$ cycle. If there is no triplet in the deleted knowledge graph, an equal interval algorithm is used to determine respective weights of the N entities, and the weights of other entities except the N entities in the original knowledge graph are determined as target weight values. Illustratively, the target weight value is 0.

Figure 3:
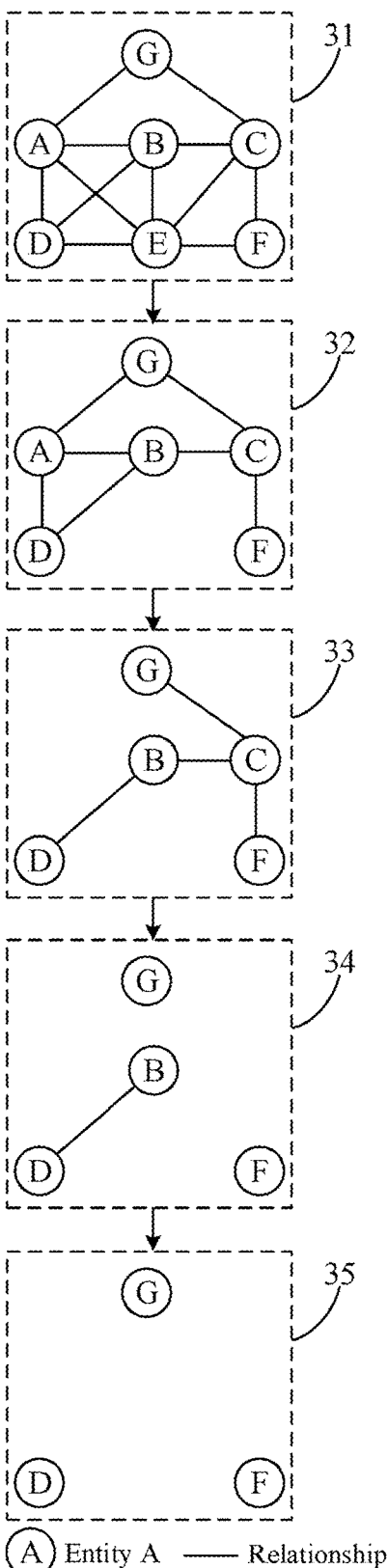
FIG. 3 is a schematic diagram of a knowledge graph according to embodiments of this disclosure.

For example, as shown in FIG. 3, FIG. 3 is a schematic diagram of a knowledge graph according to embodiments of this disclosure. The initial knowledge graph is as shown in 31 of FIG. 3. Knowledge graph 31 includes entities A, B, C, D, E, F, and G, and there is a relationship between entity A and entities B, D, E, and G, i.e. entity A has four triplets. There is a relationship between entity B and entities A, D, E, and C, i.e. entity B has four triplets. There is a relationship between entity C and entities B, E, F, and G, i.e. entity C has four triplets. There is a relationship between entity D and entities A, B and E, i.e. entity D has three triplets. There is a relationship between entity E and entities A, B, C, D, and F, i.e. entity E has five triplets. There is a relationship between entity F and entities C and E, i.e. entity F has two triplets. There is a relationship between entity G and entities A and C, i.e. entity G has two triplets.

In the first cycle, the current knowledge graph is knowledge graph 31. At this moment, entity E has the most triplets, and entity E is denoted as the first entity. Entity E and the triplets of entity E in knowledge graph 31 are deleted, i.e. entity E and edges of entity E are deleted. At this moment, the deleted knowledge graph is as shown in knowledge graph 32. Knowledge graph 32 includes entities A, B, C, D, F, and G, and there is a relationship between entity A and entities B, D and G, i.e. entity A has three triplets. There is a relationship between entity B and entities A, D and C, i.e. entity B has three triplets. There is a relationship between entity C and entities B, F and G, i.e. entity C has three triplets. There is a relationship between entity D and entities A and B, i.e. entity D has two triplets. There is a relationship between entity F and entity C, i.e. entity F has one triplet. There is a relationship between entity G and entities A and C, i.e. entity G has two triplets.

In the second cycle, the current knowledge graph is knowledge graph 32. At this moment, entities A, B and C have the most triplets, and one of the entities may be randomly selected as the second entity. For example, entity A is selected as the second entity. Entity A and the triplets of entity A in knowledge graph 32 are deleted, i.e. entity A and edges of entity A are deleted. At this moment, the deleted knowledge graph is as shown in knowledge graph 33. Knowledge graph 33 includes entities B, C, D, F, and G, and there is a relationship between entity B and entities D and C, i.e. entity B has two triplets. There is a relationship between entity C and entities B, F and G, i.e. entity C has three triplets. There is a relationship between entity D and entity B, i.e. entity D has one triplet. There is a relationship between entity F and entity C, i.e. entity F has one triplet. There is a relationship between entity G and entity C, i.e. entity G has one triplet.

In the third cycle, the current knowledge graph is knowledge graph 33. At this moment, entity C has the most triplets, and entity C is selected as the third entity. Entity C and the triplets of entity C in knowledge graph 33 are deleted, i.e. entity C and edges of entity C are deleted. At this moment, the deleted knowledge graph is as shown in knowledge graph 34. Knowledge graph 34 includes entities B, D, F, and G, and there is a relationship between entity B and entity D, i.e. entity B has one triplet. There is a relationship between entity D and entity B, i.e. entity D has one triplet. Both entities F and G have no triplets.

In the fourth cycle, the current knowledge graph is knowledge graph 34. At this moment, entities B and D have the most triplets, and entity B is randomly selected as the fourth entity. Entity B and the triplets of entity B in knowledge graph 34 are deleted, i.e. entity B and edges of entity B are deleted. At this moment, the deleted knowledge graph is as shown in knowledge graph 35. Knowledge graph 35 includes entities D, F and G. Entities D, F and G all have no triplets, and the cycle ends.

According to the above-mentioned cycles, it can be seen that the first to fourth entities are entities E, A, C, and B respectively, and an equal interval algorithm may be used to determine respective weights of the four entities, i.e. the respective weights of entities E, A, C, and B are 1, 0.66, 0.33, and 0 respectively, and the weights of the other entities D, G and F are 0 respectively.

In an exemplary embodiment, after determining the weight of each of the entities in the first knowledge graph, the weight of an entity (i.e. first entity) in the first knowledge graph in any one of the first candidate entity pairs can be extracted. After determining the weight of each of the entities in the second knowledge graph, the weight of an entity (i.e. second entity) in the second knowledge graph in any one of the first candidate entity pairs can be extracted. A product of the weight of an entity (i.e. first entity) in the first knowledge graph in any one of the first candidate entity pairs and the weight of an entity (i.e. second entity) in the second knowledge graph in any one of the first candidate entity pairs is calculated to obtain a product result serving as the weight of any one of the first candidate entity pairs, and a difficult alignment degree of any one of the first candidate entity pairs is calculated based on the weight of any one of the first candidate entity pairs. Illustratively, the process may be represented by the following Equation 5.

$$P_5 = \sigma \times \text{cover}(e_1(i)) \times \text{cover}(e_2(i)) \qquad \text{(Equation 5)}$$

where $P_5$ represents a difficult alignment degree of an $i^{th}$ first candidate entity pair, $\sigma$ represents a fourth weight, the value of the fourth weight is obtained from artificial experience or by calculation, and the manner of calculating the fourth weight is not limited. $\text{cover}(e_1(i)) \times \text{cover}(e_2(i))$ represents a weight of the $i^{th}$ first candidate entity pair, where $\text{cover}(e_1(i))$ represents a weight of a first entity $e_1(i)$ in the $i^{th}$ first candidate entity pair, and cover($e_2(i)$) represents a weight of a second entity $e_2(i)$ in the $i^{th}$ first candidate entity pair.

In another possible implementation, a difficult alignment degree of any one of the first candidate entity pairs is calculated according to a character similarity, a semantic similarity, an entity attribute proportion, a triplet proportion, and a weight of the first candidate entity pair. The manners of calculating the character similarity, the semantic similarity, the entity attribute proportion, the triplet proportion, and the weight are described in the related description above, and will not be described in detail herein.

In an exemplary embodiment, the corresponding difficult alignment degree is calculated according to the character similarity, i.e. $P_1$ as described above. The corresponding difficult alignment degree is calculated according to the semantic similarity, i.e. $P_2$ as described above. The corresponding difficult alignment degree is calculated according to the entity attribute proportion, i.e. $P_3$ as described above. The corresponding difficult alignment degree is calculated according to the triplet proportion, i.e. $P_4$ as described above. The corresponding difficult alignment degree is calculated according to the weight, i.e. $P_5$ as described above. A final difficult alignment degree of the first candidate entity pair is calculated according to Equation score($e_1(i)$, $e_2(i)$)= $(P_1+P_3+P_4+P_5)\times P_2$, where score($e_1(i),e_2(ii)$) represents a final difficult alignment degree of an $i^{th}$ first candidate entity pair.

Step 24: Select a plurality of first target entity pairs from the first candidate entity pairs based on the difficult alignment degree (alignment difficulty degree) of each of the first candidate entity pairs.

In an exemplary embodiment, a difficult alignment degree greater than or equal to a target difficult alignment degree may be selected from the difficult alignment degree of each of the first candidate entity pairs, and the first candidate entity pair corresponding to the selected difficult alignment degree may be determined as a first target entity pair. The size of the target difficult alignment degree is not limited, and is obtained from artificial experience or by calculation, and the manner of calculating the target difficult alignment degree is also not limited.

Step 25: Acquire a labeled alignment result of each of the first target entity pairs, and obtain a target knowledge graph alignment model according to the predicted alignment probability and the labeled alignment result of each of the first target entity pairs. For example, a labeled alignment result of each of the first target entity pairs is acquired, and a trained knowledge graph alignment model is obtained according to the predicted alignment probability and the labeled alignment result of each of the first target entity pairs.

For any one of the first target entity pairs, the first target entity pair is manually labeled so as to obtain a labeled alignment result of the first target entity pair. To facilitate manual labeling, in a possible implementation, the first target entity pair is displayed through a labeling interaction interface, and a labeled alignment result of the first target entity pair is obtained in response to a labeled alignment operation manually performed on the first target entity pair on the labeling interaction interface.

In another possible implementation, the operation of acquiring a labeled alignment result of each of the first target entity pairs includes: displaying, for any one of the first target entity pairs, link information of the first target entity pair on a labeling interaction interface, the link information including at least one of entity attribute information and triplet information of the entities in the first target entity pair; and obtaining a labeled alignment result of the first target entity pair in response to a labeled alignment operation performed on the first target entity pair on the labeling interaction interface according to the link information of the first target entity pair.

In an exemplary embodiment, link information of the entities in any one of the first target entity pairs is displayed on the labeling interaction interface. By triggering the link information of any one of the entities, related information of the entity corresponding to the link information is viewed. The related information includes, but is not limited to, at least one of entity attribute information and triplet information, so as to determine whether to align according to the link information of the entities in any one of the first target entity pairs, thereby performing a labeled alignment operation on the labeling interaction interface. In response to the labeled alignment operation, a labeled alignment result of any one of the first target entity pairs is obtained. The labeled alignment result includes alignment or misalignment.

As shown in FIG. 4, FIG. 4 is a display diagram of a labeling interaction interface according to embodiments of this disclosure. The labeling interaction interface displays the first target entity pairs in the form of a table. Any one of the first target entity pairs includes a serial number, an entity in a first knowledge graph, an entity in a second knowledge graph, and alignment or not. The serial number of the first target entity pair is represented in the form of a positive integer, the entity in the first knowledge graph and the entity in the second knowledge graph are represented in the form of link information, and the alignment or not includes an alignment option and a misalignment option. As shown in FIG. 4, for a first target entity pair with the serial number of 6, the entity in the first knowledge graph is link information 6a, and by triggering link information 6a, entity attribute information and triplet information which belong to the entity in the first knowledge graph in the first target entity pair are checked. The entity in the second knowledge graph is link information 6b, and by triggering link information 6b, entity attribute information and triplet information which belong to the entity in the second knowledge graph in the first target entity pair are checked. It is determined whether to align through link information 6a and link information 6b. If the alignment option is selected as shown in FIG. 4, it indicates that the labeled alignment result of the first target entity pair with the serial number of 6 is alignment.

In an exemplary embodiment, a target knowledge graph alignment model is obtained by training according to the predicted alignment probability and the labeled alignment result of each of the first target entity pairs.

In a possible implementation, before selecting a plurality of first candidate entity pairs from the first entity pairs based on a predicted alignment probability of each of the first entity pairs, the method further includes: determining, for any one of the first entity pairs, a predicted alignment probability of the first entity pair based on a first knowledge graph alignment model.

The operation of obtaining a target knowledge graph alignment model according to the predicted alignment probability and the labeled alignment result of each of the first target entity pairs includes: training the first knowledge graph alignment model according to the predicted alignment probability and the labeled alignment result of each of the first target entity pairs to obtain a second knowledge graph alignment model; and determining the second knowledge graph alignment model as the target knowledge graph alignment model in response to satisfying a training end condition.

In an exemplary embodiment, the structure and size of the first knowledge graph alignment model are not limited. The first knowledge graph alignment model extracts feature information of any one of the first entity pairs and determines a predicted alignment probability of the first entity pair according to the feature information. The feature information includes but is not limited to: at least one of a triplet feature of the first entity pair, an attribute feature of the first entity pair, a character string feature of the first entity pair, a semantic feature of the first entity pair, etc., and the predicted alignment probability is greater than or equal to 0 and is less than or equal to 1.

When the first knowledge graph alignment model is trained according to the predicted alignment probability and the labeled alignment result of each of the first target entity pairs to obtain a second knowledge graph alignment model, a loss value is calculated based on a loss function of the first knowledge graph alignment model according to the predicted alignment probability and the labeled alignment result of each of the first target entity pairs, model parameters of the first knowledge graph alignment model are optimized according to the loss value, and the optimized first knowledge graph alignment model is determined as the second knowledge graph alignment model. The loss function of the first knowledge graph alignment model is not limited in the embodiments of this disclosure.

When a training end condition is satisfied, the second knowledge graph alignment model is determined as the target knowledge graph alignment model. The satisfaction of the training end condition includes but is not limited to: the corresponding number of trainings for the first knowledge graph alignment model is a target number; the loss value used for training the first knowledge graph alignment model is less than a loss value threshold; and the loss value used for training the first knowledge graph alignment model is converged, etc. The target number and the loss value threshold are set from experience, or flexibly adjusted according to application scenarios, and this is not limited in the embodiments of this disclosure.

In another possible implementation, after training the first knowledge graph alignment model according to the predicted alignment probability and the labeled alignment result of each of the first target entity pairs to obtain a second knowledge graph alignment model, the method further includes: determining the second knowledge graph alignment model as a knowledge graph alignment model for a next training in response to not satisfying the training end condition, and acquiring a second entity pair set, the second entity pair set including a plurality of second entity pairs with unlabeled alignment results, the second entity pair including an entity in a third knowledge graph and an entity in a fourth knowledge graph; determining, for any one of the second entity pairs, a predicted alignment probability of the second entity pair based on the knowledge graph alignment model for a next training; select a plurality of second candidate entity pairs from the second entity pairs based on a predicted alignment probability of each of the second entity pairs; calculate a difficult alignment degree of each of the second candidate entity pairs; select a plurality of second target entity pairs from the second candidate entity pairs based on the difficult alignment degree of each of the second candidate entity pairs; acquire a labeled alignment result of each of the second target entity pairs, and train the knowledge graph alignment model for a next training according to the predicted alignment probability and the labeled alignment result of each of the second target entity pairs to obtain a third knowledge graph alignment model; and determine the third knowledge graph alignment model as the target knowledge graph alignment model in response to satisfying the training end condition.

In an exemplary embodiment, the second entity pair set may or may not be the same as the first entity pair set, the third knowledge graph is a first or second or another knowledge graph, and the fourth knowledge graph is a first or second or another knowledge graph.

When the training end condition is not satisfied, the second knowledge graph alignment model is determined as a knowledge graph alignment model for a next training, a predicted alignment probability of any one of the second entity pairs in the second entity pair set is determined based on the knowledge graph alignment model for a next training, and a predicted alignment probability greater than or equal to the first alignment probability and less than or equal to the second alignment probability is selected from the predicted alignment probability of each of the second entity pairs, and then a second entity pair corresponding to the selected predicted alignment probability is determined as a second candidate entity pair, and a difficult alignment degree of any one of the second candidate entity pairs is calculated according to at least one of a character similarity, a semantic similarity, an entity attribute proportion, a triplet proportion, and a weight of the second candidate entity pair. A difficult alignment degree greater than or equal to a target difficult alignment degree is selected from the difficult alignment degree of each of the second candidate entity pairs, and a second candidate entity pair corresponding to the selected difficult alignment degree is determined as a second target entity pair. Any one of the second target entity pairs is manually labeled so as to obtain a labeled alignment result of the second target entity pair, and then a loss value of the knowledge graph alignment model for a next training is calculated according to the predicted alignment probability and labeled alignment results of each of the second target entity pairs, model parameters of the knowledge graph alignment model for a next training are optimized according to the loss value, and the optimized knowledge graph alignment model for a next training is determined as the third knowledge graph alignment model.

When the training end condition is satisfied, the third knowledge graph alignment model is determined as the target knowledge graph alignment model. When not satisfied, the third knowledge graph alignment model is determined as the knowledge graph alignment model for a next training, and the above-mentioned training step is re-performed.

The implementation of obtaining a target knowledge graph alignment model based on the second entity pair set may be seen in the above-mentioned implementation of obtaining a target knowledge graph alignment model based on the first entity pair set, the implementation principles thereof are similar, and repeated descriptions are omitted in the embodiments of this disclosure.

In another possible implementation of the embodiments of this disclosure, the operation of obtaining a target knowledge graph alignment model according to the predicted alignment probability and the labeled alignment result of each of the first target entity pairs includes: selecting a plurality of alignable entity pairs from the first entity pairs based on the predicted alignment probability of each of the first entity pairs; determining a labeled alignment result of each of the alignable entity pairs according to a predicted alignment probability of each of the alignable entity pairs;

and obtain the target knowledge graph alignment model according to the predicted alignment probability and the labeled alignment result of each of the first target entity pairs and the predicted alignment probability and the labeled alignment result of each of the alignable entity pairs.

In an exemplary embodiment, a predicted alignment probability less than or equal to a third alignment probability is selected from the predicted alignment probability of each of the first entity pairs, and/or a predicted alignment probability greater than or equal to a fourth alignment probability is selected, and a first entity pair corresponding to the selected predicted alignment probability is determined as an alignable entity pair. The third alignment probability is less than or equal to the first alignment probability, the fourth alignment probability is greater than or equal to the second alignment probability, and the third alignment probability is less than or equal to the fourth alignment probability.

For any one of the alignable entity pairs, if the predicted alignment probability of the alignable entity pair is less than or equal to the third alignment probability, it indicates that the alignable entity pair is misaligned with a high probability, and it is determined that the labeled alignment result of the alignable entity pair is misalignment. For any one of the alignable entity pairs, if the predicted alignment probability of the alignable entity pair is greater than or equal to the fourth alignment probability, it indicates that the alignable entity pair is aligned with a high probability, and it is determined that the labeled alignment result of the alignable entity pair is alignment, and > the target knowledge graph alignment model is obtained by training according to the predicted alignment probability and the labeled alignment result of each of the first target entity pairs and the predicted alignment probability and the labeled alignment result of each of the alignable entity pairs.

In an exemplary embodiment, the process of obtaining the target knowledge graph alignment model by training according to the predicted alignment probability and the labeled alignment result of each of the first target entity pairs and the predicted alignment probability and the labeled alignment result of each of the alignable entity pairs includes: calculating a loss value based on a loss function of the first knowledge graph alignment model according to the predicted alignment probability and the labeled alignment result of each of the first target entity pairs and the predicted alignment probability and the labeled alignment result of each of the alignable entity pairs, optimizing model parameters of the first knowledge graph alignment model according to the loss value, and determining the optimized first knowledge graph alignment model as the second knowledge graph alignment model; and determining the second knowledge edge graph alignment model as the target knowledge graph alignment model in response to satisfying a training end condition.

According to the technical solutions provided by the embodiments of this disclosure, a plurality of first candidate entity pairs are preliminarily selected from first entity pairs based on predicted alignment probabilities of the first entity pairs, first target entity pairs are then selected from the first candidate entity pairs based on a difficult alignment degree of each of the first candidate entity pairs, and labeled alignment results of the first target entity pairs are acquired to obtain a target knowledge graph alignment model through the predicted alignment probabilities and the labeled alignment results of the first target entity pairs. The number of entity pairs needing to be labeled is greatly reduced by selecting twice, thereby saving the time cost, increasing the model training speed, and improving the alignment efficiency. Furthermore, the predicted alignment probabilities and the difficult alignment degrees are considered respectively during selection twice, which is beneficial to ensure the training reliability of a first target entity selected, thus ensuring the model training effect and the alignment performance.

A method for training a knowledge graph alignment model according to embodiments of this disclosure will be described in detail with reference to FIG. 5. As shown in FIG. 5, FIG. 5 is a training diagram of a knowledge graph alignment model according to embodiments of this disclosure. In each training operation, a first knowledge graph and a second knowledge graph are acquired, information indicated by reference numeral 51 represents the first knowledge graph, and information indicated by reference numeral 52 represents the second knowledge graph. A first entity pair set is constructed according to entities in the first knowledge graph and entities in the second knowledge graph. The first entity pair set includes a plurality of first entity pairs, and information indicated by reference numeral 53 represents the first entity pair set. The first entity pair set is inputted into a first knowledge graph alignment model, and a predicted alignment probability of each of the first entity pairs is outputted by the first knowledge graph alignment model. Then, first candidate entity pairs are selected from the first entity pairs according to the predicted alignment probability of each of the first entity pairs, and a difficult alignment degree of each of the first candidate entity pairs is calculated. Then a first target entity pair is selected from the first candidate entity pairs according to the difficult alignment degree of each of the first candidate entity pairs, a labeled alignment result of each of the first target entity pairs is manually labeled, the first target entity pairs manually labeled are determined as training data, and model parameters of the first knowledge graph alignment model are optimized according to the training data.

The above-mentioned training operation is repeated until the number of trainings reaches a target number, and the optimized first knowledge graph alignment model is determined as the target knowledge graph alignment model. By repeating the training, the alignment performance of the model can be improved.

As shown in FIG. 6, FIG. 6 is a training effect diagram of a knowledge graph alignment model according to embodiments of this disclosure. Knowledge graph alignment models are a multi-view knowledge graph embedding for entity alignment (MultiKE) model and a cross-lingual knowledge graph alignment via graph convolutional networks (GCNAlign) model respectively. Each model is divided into three trainings, and the alignment performance of the model is reflected by an F1 score and a manual labeling amount. The F1 score, also known as a balanced F score, is an index used to measure the accuracy rate and recall rate of the model. As the F1 score is larger, the alignment performance of the model is better. The manual labeling amount refers to the number of first target entity pairs manually labeled.

For the MultiKE model, the F1 score is 0.896 and the manual labeling amount is 1000 in the first training, the F1 score is 0.923 and the manual labeling amount is 400 in the second training, and the F1 score is 0.927 and the manual labeling amount is 50 in the third training. For the GCNAlign model, the F1 score is 0.895 and the manual labeling amount is 1200 in the first training, the F1 score is 0.903 and the manual labeling amount is 300 in the second training, and the F1 score is 0.904 and the manual labeling amount is 30 in the third training. It can be clearly seen that with the increase of trainings, the alignment performance of the model is better, and the manual labeling amount is smaller.

In practical applications, the knowledge graph alignment model includes, but is not limited to, the MultiKE model and the GCNAlign model. Illustratively, the knowledge graph alignment model may also be a bootstrapping entity alignment with knowledge graph embedding (BootEA) model.

The above-mentioned method for training a knowledge graph alignment model is mainly introduced from the perspective of method steps, and will be described in conjunction with a specific scenario. In the scenario of the embodiments of this disclosure, both a first knowledge graph and a second knowledge graph are medical-related knowledge graphs (referred to as medical knowledge graphs), i.e. the first knowledge graph is a first medical knowledge graph, and the second knowledge graph is a second medical knowledge graph. Entities in the medical knowledge graphs include diseases, drugs, disease sites, diagnosis departments, prevention means, symptoms, etc. The first knowledge graph alignment model is a MultiKE model.

In an exemplary embodiment, a first medical knowledge graph and a second medical knowledge graph are acquired. The first medical knowledge graph includes entities "malignant tumor" and "fever", and the second medical knowledge graph includes entities "cancer" and "radiology department". A first entity pair set is constructed according to the entities in the first medical knowledge graph and the entities in the second medical knowledge graph. The first entity pair set includes four first entity pairs: "malignant tumor-cancer", "malignant tumor-radiology department", "fever-cancer", and "fever-radiology department". The four first entity pairs are inputted into the MultiKE model, and predicted alignment probabilities of "malignant tumor-cancer", "malignant tumor-radiology department", "fever-cancer", and "fever-radiology department" are outputted by the MultiKE model.

If the predicted alignment probabilities of "malignant tumor-cancer" and "malignant tumor-radiology department" are both greater than a first alignment probability and less than a second alignment probability, "malignant tumor-cancer" and "malignant tumor-radiology department" are determined as a first candidate entity pair, and difficult alignment degrees of "malignant tumor-cancer" and "malignant tumor-radiology department" are calculated. If the difficult alignment degree of "malignant tumor-cancer" is greater than a target difficult alignment degree, "malignant tumor-cancer" is determined as a first target entity pair, a labeled alignment result of manually labeling "malignant tumor-cancer" is determined as alignment, and model parameters of the MultiKE model are optimized according to "malignant tumor-cancer" labeled with alignment.

The above-mentioned training operation is repeated until the number of trainings reaches a target number, and the trained MultiKE model is determined as a target knowledge graph alignment model.

In practical applications, the method for training a knowledge graph alignment model may also be applied in other fields besides medical treatment. That is to say, the first knowledge graph and the second knowledge graph may also be knowledge graphs in other fields. For example, the first knowledge graph and the second knowledge graph are a financial knowledge graph, a legal knowledge graph, an industrial knowledge graph, etc. The manner of training the knowledge graph alignment model using knowledge graphs of other fields is similar to the above-mentioned manner of training the MultiKE model using the medical knowledge graph, and will not be described in detail herein.

Figure 7:
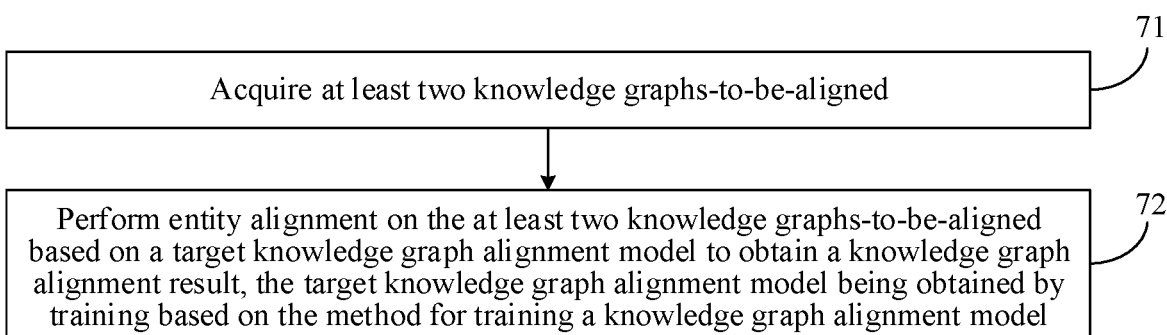
FIG. 7 is a flowchart of a knowledge graph alignment method according to embodiments of this disclosure.

Based on the implementation environment as shown in FIG. 1, embodiments of this disclosure also provide a knowledge graph alignment method, which may be performed by the electronic device 11 in FIG. 1 by taking a flowchart of a knowledge graph alignment method according to embodiments of this disclosure shown in FIG. 7 as an example. The method includes steps 71 and 72.

Step 71: Acquire at least two knowledge graphs-to-be-aligned.

Any two knowledge graphs-to-be-aligned are different knowledge graphs, and the size, content and acquisition manner of the knowledge graphs are not limited in the embodiments of this disclosure. For example, any knowledge graph-to-be-aligned is captured over a network or inputted by a user.

Step 72: Perform entity alignment on the at least two knowledge graphs-to-be-aligned based on a target knowledge graph alignment model to obtain a knowledge graph alignment result. The target knowledge graph alignment model is obtained by training based on the method for training a knowledge graph alignment model.

The target knowledge graph alignment model in the embodiments of this disclosure is obtained by training based on the method for training a knowledge graph alignment model according to the previous embodiments of this disclosure (i.e. the embodiments shown in FIG. 2), can be seen from the related description of the previous embodiments of this disclosure, and will not be described in detail herein.

In a possible implementation, the operation of performing entity alignment on the at least two knowledge graphs-to-be-aligned based on a target knowledge graph alignment model to obtain a knowledge graph alignment result includes: determining a predicted alignment probability of each of entity pairs-to-be-aligned based on the target knowledge graph alignment model, any one of the entity pairs-to-be-aligned including any two entities belonging to different knowledge graphs in the at least two knowledge graphs-to-be-aligned; and aligning the entity pair-to-be-aligned in response to the predicted alignment probability of the entity pair-to-be-aligned being greater than or equal to a target alignment probability.

Any one of the entity pairs-to-be-aligned is formed based on an entity in one knowledge graph of at least two knowledge graphs-to-be-aligned and an entity in the other knowledge graph of the at least two knowledge graphs-to-be-aligned, the entity pair-to-be-aligned is inputted into a target knowledge graph alignment model, feature information of the entity pair-to-be-aligned is extracted by the target knowledge graph alignment model, and a predicted alignment probability of the entity pair-to-be-aligned is determined according to the feature information. The feature information includes but is not limited to: at least one of a triplet feature of the entity pair-to-be-aligned, an attribute feature of the entity pair-to-be-aligned, a character string feature of the entity pair-to-be-aligned, a semantic feature of the entity pair-to-be-aligned, etc., and the predicted alignment probability is greater than or equal to 0 and is less than or equal to 1.

When the predicted alignment probability of any one of the entity pairs-to-be-aligned is greater than or equal to a target alignment probability, the entity pair-to-be-aligned is aligned, i.e. an alignment relationship between two entities in the entity pair-to-be-aligned is established. When the predicted alignment probability of the entity pair-to-be-aligned is less than the target alignment probability, it indicates that the entity pair-to-be-aligned is misaligned. At this moment, no processing is performed on the entity pair-to-be-aligned, or a misalignment relationship between two entities in the entity pair-to-be-aligned is established. The target alignment probability is obtained from artificial experience or by calculation, and the manner of calculating the target alignment probability is not limited herein.

When any one of the entity pairs-to-be-aligned is aligned, it indicates that two entities in the entity pair-to-be-aligned are directed to the same object in the real world. That is, two knowledge graphs-to-be-aligned corresponding to the entity pair-to-be-aligned contain the same object, and the two knowledge graphs-to-be-aligned corresponding to the entity pair-to-be-aligned may be combined, so as to realize the integration of two knowledge graphs with different granularities and different vertical domains, and improve the quality and coverage of the knowledge graphs.

The technical solutions provided by the embodiments of this disclosure are to realize entity alignment of at least two knowledge graphs-to-be-aligned based on the target knowledge graph alignment model trained by the method for training a knowledge graph alignment model according to the previous embodiments of this disclosure. When training a knowledge graph alignment model, a plurality of first candidate entity pairs are preliminarily selected from first entity pairs based on a predicted alignment probability of each of the first entity pairs, first target entity pairs are then selected from the first candidate entity pairs based on a difficult alignment degree of each of the first candidate entity pairs, and labeled alignment results of the first target entity pairs are acquired to obtain a target knowledge graph alignment model through the predicted alignment probabilities and the labeled alignment results of the first target entity pairs. The number of entity pairs needing to be labeled is greatly reduced by selecting twice, thereby saving the time cost, increasing the model training speed, and improving the alignment efficiency. Furthermore, the predicted alignment probabilities and the difficult alignment degrees are considered respectively during selection twice, which is beneficial to ensure the training reliability of a first target entity selected, thus ensuring the model training effect and the alignment performance.

The above-mentioned knowledge graph alignment method is mainly introduced from the perspective of method steps, and will be described in conjunction with a specific scenario. In the scenario of the embodiments of this disclosure, a knowledge graph-to-be-aligned is a medical knowledge graph, a target knowledge graph alignment model is the target knowledge graph alignment model obtained after training the MultiKE model using the medical knowledge graph according to the method for training a knowledge graph alignment model as shown above, i.e. the target knowledge graph alignment model is the trained MultiKE model.

In an exemplary embodiment, three medical knowledge graphs are acquired, denoted as medical knowledge graphs 1-3, respectively. Medical knowledge graph 1 contains entities "influenza" and "sneeze", medical knowledge graph 2 contains entity "cold", and medical knowledge graph 3 contains entity "compound aspirin". Two entity pairs-to-be-aligned: "influenza-cold" and "influenza-compound aspirin" are constructed according to any two entities belonging to different medical knowledge graphs, and predicted alignment probabilities of "influenza-cold" and "influenza-compound aspirin" are determined based on the trained MultiKE model. The predicted alignment probability of "influenza-cold" is greater than a target alignment probability, and "influenza-cold" is aligned. If the predicted alignment probability of "influenza-compound aspirin" is less than the target alignment probability, "influenza-compound aspirin" will not be treated.

In the above-mentioned manner, "influenza-cold" is aligned, indicating that influenza and cold are directed to the same object in the real world. That is, medical knowledge graph 1 and medical knowledge graph 2 contain the same object, and medical knowledge graph 1 and medical knowledge graph 2 may be combined, so as to realize the integration of two medical knowledge graphs with different granularities and different vertical domains, and improve the quality and coverage of the medical knowledge graphs.

In practical applications, based on the principle similar to the above-mentioned method for aligning medical knowledge graphs, knowledge graphs of other fields may be aligned, so as to realize the integration of two or more knowledge graphs of other fields with different granularities and different vertical domains, and improve the quality and coverage of knowledge graphs of other fields. For example, two financial knowledge graphs are aligned, or two legal knowledge graphs are aligned. The implementation principles are similar to the above-mentioned method for aligning two medical knowledge graphs, and will not be described in detail herein.

Figure 8:
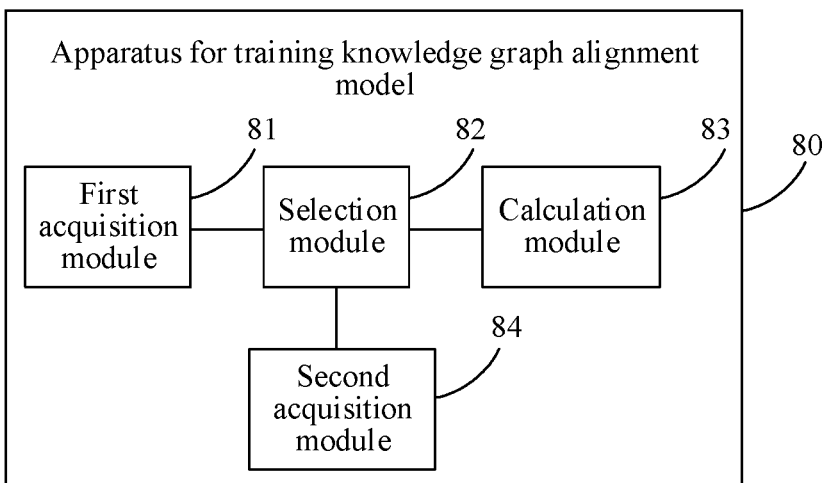
FIG. 8 is a structural diagram of an apparatus for training a knowledge graph alignment model according to embodiments of this disclosure.

As shown in FIG. 8, FIG. 8 is a structural diagram of an apparatus 80 for training a knowledge graph alignment model according to embodiments of this disclosure. The apparatus 80 for training a knowledge graph alignment model includes the following modules.

A first acquisition module 81 is configured to acquire a first entity pair set. The first entity pair set includes a plurality of first entity pairs with unlabeled alignment results. The first entity pair includes an entity in a first knowledge graph and an entity in a second knowledge graph.

A selection module 82 is configured to select a plurality of first candidate entity pairs from the first entity pairs based on a predicted alignment probability of each of the first entity pairs.

A calculation module 83 is configured to calculate a difficult alignment degree of each of the first candidate entity pairs. The difficult alignment degree of any one of the first candidate entity pairs is used for indicating a degree of difficulty in aligning the first candidate entity pair.

The selection module 82 is further configured to select a plurality of first target entity pairs from the first candidate entity pairs based on the difficult alignment degree of each of the first candidate entity pairs.

A second acquisition module 84 is configured to acquire a labeled alignment result of each of the first target entity pairs, and obtain a target knowledge graph alignment model according to the predicted alignment probability and the labeled alignment result of each of the first target entity pairs.

In a possible implementation, the calculation module 83 is configured to calculate, for any one of the first candidate entity pairs, a character similarity of the first candidate entity pair based on character features of the entities in the first candidate entity pair; and determine the difficult alignment degree of the first candidate entity pair based on the character similarity.

In a possible implementation, the calculation module 83 is configured to calculate, for any one of the first candidate entity pairs, a semantic similarity of the first candidate entity pair based on semantic features of the entities in the first candidate entity pair; and determine the difficult alignment degree of the first candidate entity pair based on the semantic similarity.

In a possible implementation, the calculation module 83 is configured to calculate, for any one of the first candidate entity pairs, an entity attribute proportion of the first candidate entity pair based on the number of entity attributes of the first candidate entity pair, the number of entity attributes of the first knowledge graph and the number of entity attributes of the second knowledge graph; and determine the difficult alignment degree of the first candidate entity pair based on the entity attribute proportion.

In a possible implementation, the calculation module 83 is configured to calculate, for any one of the first candidate entity pairs, a triplet proportion of the first candidate entity pair based on the number of triplets of the entities in the first candidate entity pair, the number of triplets of the entities in the first knowledge graph and the number of triplets of the entities in the second knowledge graph; and determine the difficult alignment degree of the first candidate entity pair based on the triplet proportion.

In a possible implementation, the calculation module 83 is configured to determine, for any one of the first candidate entity pairs, a weight of a first entity based on the number of triplets of the entities in the first knowledge graph, and determine a weight of a second entity based on the number of triplets of the entities in the second knowledge graph, the first entity being an entity in the first knowledge graph included in the candidate entity pair, the second entity being an entity in the second knowledge graph included in the candidate entity pair; calculate a weight of the first candidate entity pair based on the weight of the first entity and the weight of the second entity; and calculate the difficult alignment degree of the first candidate entity pair based on the weight of the first candidate entity pair.

In a possible implementation, the second acquisition module 84 is configured to display, for any one of the first target entity pairs, link information of the first target entity pair on a labeling interaction interface, the link information including at least one of entity attribute information and triplet information of the entities in the first target entity pair; and obtain a labeled alignment result of the first target entity pair in response to a labeled alignment operation performed on the first target entity pair on the labeling interaction interface according to the link information of the first target entity pair.

In a possible implementation, the apparatus 80 for training a knowledge graph alignment model further includes the following module.

A determining module is configured to determine, for any one of the first entity pairs, a predicted alignment probability of the first entity pair based on a first knowledge graph alignment model.

The second acquisition module 84 is configured to train the first knowledge graph alignment model according to the predicted alignment probability and the labeled alignment result of each of the first target entity pairs to obtain a second knowledge graph alignment model; and determine the second knowledge graph alignment model as the target knowledge graph alignment model in response to satisfying a training end condition.

In a possible implementation, the second acquisition module 84 is further configured to determine the second knowledge graph alignment model as a knowledge graph alignment model for a next training in response to not satisfying the training end condition, and acquire a second entity pair set, the second entity pair set including a plurality of second entity pairs with unlabeled alignment results, the second entity pair including an entity in a third knowledge graph and an entity in a fourth knowledge graph; determine, for any one of the second entity pairs, a predicted alignment probability of the second entity pair based on the knowledge graph alignment model for a next training; select a plurality of second candidate entity pairs from the second entity pairs based on a predicted alignment probability of each of the second entity pairs; calculate a difficult alignment degree of each of the second candidate entity pairs; select a plurality of second target entity pairs from the second candidate entity pairs based on the difficult alignment degree of each of the second candidate entity pairs; acquire a labeled alignment result of each of the second target entity pairs, and train the knowledge graph alignment model for a next training according to the predicted alignment probability and the labeled alignment result of each of the second target entity pairs to obtain a third knowledge graph alignment model; and determine the third knowledge graph alignment model as the target knowledge graph alignment model in response to satisfying the training end condition.

In a possible implementation, the second acquisition module 84 is configured to select a plurality of alignable entity pairs from the first entity pairs based on the predicted alignment probability of each of the first entity pairs; determine a labeled alignment result of each of the alignable entity pairs according to a predicted alignment probability of each of the alignable entity pairs; and obtain the target knowledge graph alignment model according to the predicted alignment probability and the labeled alignment result of each of the first target entity pairs and the predicted alignment probability and the labeled alignment result of each of the alignable entity pairs.

When the apparatus provided in FIG. 8 implements functions, the foregoing embodiment is merely described by using an example of dividing various functional modules. In actual application, the foregoing function allocation is completed by different functional modules according to needs, that is, the internal structure of the device is divided into different functional modules, to complete all or some of functions described above. In addition, the apparatus and method embodiments provided in the foregoing embodiments belong to the same conception. For the specific implementation process, reference may be made to the method embodiments, and details are not described herein again.

Figure 9:
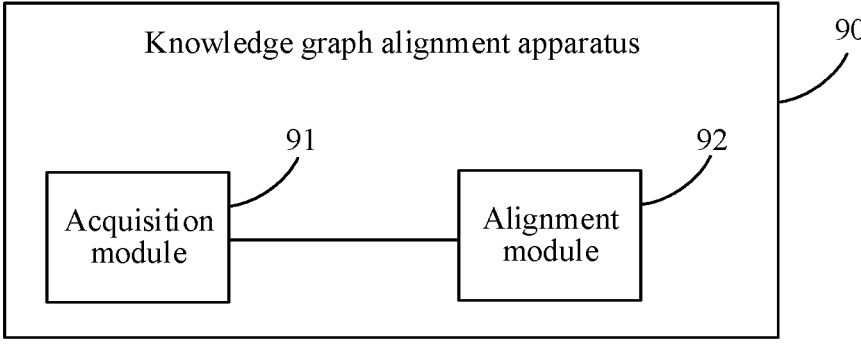
FIG. 9 is a structural diagram of a knowledge graph alignment apparatus according to embodiments of this disclosure.

As shown in FIG. 9, FIG. 9 is a structural diagram of a knowledge graph alignment apparatus 90 according to embodiments of this disclosure. The knowledge graph alignment apparatus 90 includes the following modules.

An acquisition module 91 is configured to acquire at least two knowledge graphs-to-be-aligned.

An alignment module 92 is configured to perform entity alignment on the at least two knowledge graphs-to-be-aligned based on a target knowledge graph alignment model to obtain a knowledge graph alignment result. The target knowledge graph alignment model is obtained by training based on the method for training a knowledge graph alignment model described in any of the above.

In a possible implementation, the alignment module 92 is configured to determine a predicted alignment probability of each of entity pairs-to-be-aligned based on the target knowledge graph alignment model, any one of the entity pairs-to-be-aligned including any two entities belonging to different knowledge graphs in the at least two knowledge graphs-to-be-aligned; and align the entity pair-to-be-aligned in response to the predicted alignment probability of the entity pair-to-be-aligned being greater than or equal to a target alignment probability.

When the apparatus provided in FIG. 9 implements functions, the foregoing embodiment is merely described by using an example of dividing various functional modules. In actual application, the foregoing function allocation is completed by different functional modules according to needs, that is, the internal structure of the device is divided into different functional modules, to complete all or some of functions described above. In addition, the apparatus and method embodiments provided in the foregoing embodiments belong to the same conception. For the specific implementation process, reference may be made to the method embodiments, and details are not described herein again.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 10:
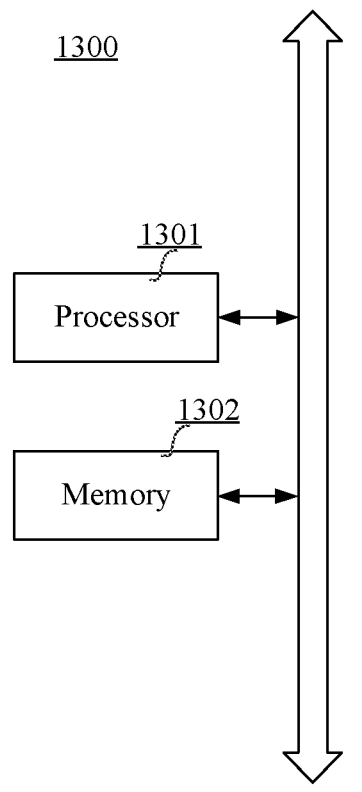
FIG. 10 is a schematic structural diagram of an electronic device according to embodiments of this disclosure.

FIG. 10 shows a structural block diagram of an electronic device 1300 according to an exemplary embodiment of this disclosure. The electronic device 1300 may be a portable mobile terminal, such as: a smartphone, a tablet computer, a moving picture experts group audio layer III (MP3) player, a moving picture experts group audio layer IV (MP4) player, a notebook computer, or a desktop computer. The electronic device 1300 may also be referred to as another name such as user equipment, a portable terminal, a laptop terminal, or a desktop terminal.

The electronic device 1300 usually includes: a processor 1301 (including processing circuitry) and a memory 1302 (including a non-transitory computer-readable storage medium).

The processor 1301 may include one or more processing cores, such as a 4-core processor or an 8-core processor. The processor 1301 may be implemented by at least one hardware form in a digital signal processing (DSP), a field-programmable gate array (FPGA), and a programmable logic array (PLA). The processor 1301 may also include a main processor and a coprocessor. The main processor is configured to process data in an active state, also referred to as a central processing unit (CPU). The coprocessor is a low-power consumption processor configured to process data in a standby state. In some embodiments, the processor 1301 may be integrated with a graphics processing unit (GPU). The GPU is configured to render and draw content that needs to be displayed on a display. In some embodiments, the processor 1301 may further include an artificial intelligence (AI) processor. The AI processor is configured to process computing operations related to machine learning.

The memory 1302 may include one or more computer-readable storage media. The computer-readable storage media may be non-transitory. The memory 1302 may further include a high-speed random access memory, as well as non-volatile memory, such as one or more disk storage devices and flash storage devices. In some embodiments, the non-transitory computer-readable storage medium in the memory 1302 is configured to store at least one instruction, and the at least one instruction is configured to be executed by the processor 1301 to implement the method for training a knowledge graph alignment model according to the method embodiments of this disclosure, or the knowledge graph alignment method according to the method embodiment of this disclosure.

A person skilled in the art may understand that a structure shown in FIG. 10 constitutes no limitation on the electronic device 1300, and the electronic device may comprise more or fewer components than those shown in the figure, or some components may be combined, or a different component deployment may be used.

Figure 11:
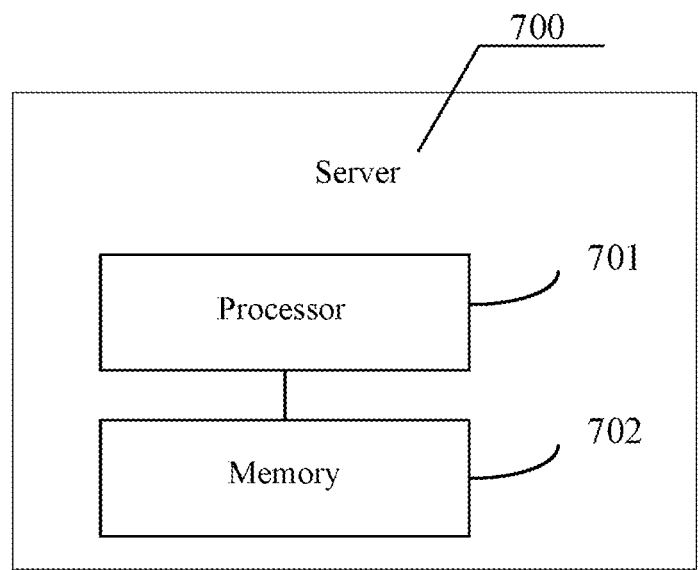
FIG. 11 is a schematic structural diagram of a server according to embodiments of this disclosure.

FIG. 11 is a schematic structural diagram of a server according to an embodiment of this disclosure. The server 700 may vary greatly due to different configurations or performance, and may include one or more central processing units (CPUs) 701 and one or more memories 702. The one or more memories 702 store at least one computer program, the at least one computer program being loaded and executed by the one or more processors 701 to implement the method for training a knowledge graph alignment model provided in the foregoing method embodiments, or the knowledge graph alignment method provided in the foregoing method embodiments. Certainly, the server 700 may also have a wired or wireless network interface, a keyboard, an input/output interface and other components to facilitate input/output. The server 700 may also include other components for implementing device functions. Details are not described herein.

In an exemplary embodiment, a non-transitory computer-readable storage medium is further provided, storing at least one computer program, the at least one computer program being loaded and executed by a processor to implement the foregoing method for training a knowledge graph alignment model.

In an exemplary embodiment, a non-transitory computer-readable storage medium is further provided, storing at least one computer program, the at least one computer program being loaded and executed by a processor to cause a computer to implement the foregoing knowledge graph alignment method.

The non-transitory computer-readable storage medium may be a read-only memory (ROM), a random access memory (random-access memory, RAM), a compact disc read-only memory (CD-ROM), a magnetic tape, a floppy disk, an optical data storage device, and the like.

In an exemplary embodiment, a computer program or a computer program product is further provided, the computer program or the computer program product storing at least one instruction, the at least one instruction being loaded and executed by a processor to implement the foregoing method for training a knowledge graph alignment model.

In an exemplary embodiment, a computer program or a computer program product is further provided, the computer program or the computer program product storing at least one instruction, the at least one instruction being loaded and executed by a processor to implement the foregoing knowledge graph alignment method.

It is to be understood that "plurality of" mentioned in the specification means two or more. And/or describes an association relationship for describing associated objects and represents that three relationships may exist. For example, A and/or B may represent the following three cases: Only A exists, both A and B exist, and only B exists. The character "/" generally indicates an "or" relationship between the associated objects.

The foregoing disclosure includes some exemplary embodiments of this disclosure which are not intended to limit the scope of this disclosure. Other embodiments shall also fall within the scope of this disclosure.

What is claimed is:

1. A method for training a knowledge graph alignment model, the method comprising:

acquiring a first entity pair set, the first entity pair set comprising a plurality of first entity pairs, each of the first entity pairs comprising an entity in a first knowledge graph and an entity in a second knowledge graph and having an unlabeled alignment relationship between the entity in the first knowledge graph and the entity in the second knowledge graph;

selecting a plurality of first candidate entity pairs from the first entity pairs based on a predicted alignment probability of each of the first entity pairs;

calculating an alignment difficulty degree of each of the first candidate entity pairs, the alignment difficulty degree of the respective ones of the first candidate entity pairs indicating a degree of difficulty in aligning the respective first candidate entity pair;

selecting a plurality of first target entity pairs from the first candidate entity pairs based on the alignment difficulty degree of each of the first candidate entity pairs;

obtaining, based on first one or more operations of an interface, a labeled alignment result of each of the first target entity pairs after the selection of the plurality of first target entity pairs; and obtaining a trained knowledge graph alignment model according to the predicted alignment probability and the labeled alignment result of each of the first target entity pairs.

2. The method according to claim 1, wherein the calculating comprises:

for each of the first candidate entity pairs, calculating a character similarity of the respective first candidate entity pair based on character features of the entities in the respective first candidate entity pair; and determining an alignment difficulty degree of the respective first candidate entity pair based on the character similarity.

3. The method according to claim 1, wherein the calculating comprises:

for each of the first candidate entity pairs, calculating a semantic similarity of the respective first candidate entity pair based on semantic features of the entities in the respective first candidate entity pair; and determining an alignment difficulty degree of the respective first candidate entity pair based on the semantic similarity.

4. The method according to claim 1, wherein the calculating comprises:

for each of the first candidate entity pairs, calculating an entity attribute proportion of the respective first candidate entity pair based on a number of entity attributes of the respective first candidate entity pair, a number of entity attributes of the first knowledge graph, and a number of entity attributes of the second knowledge graph; and determining an alignment difficulty degree of the respective first candidate entity pair based on the entity attribute proportion.

5. The method according to claim 1, wherein the calculating comprises:

for each of the first candidate entity pairs, calculating a triplet proportion of the respective first candidate entity pair based on a number of triplets of entities in the respective first candidate entity pair, a number of triplets of entities in the first knowledge graph, and a number of triplets of entities in the second knowledge graph; and determining an alignment difficulty degree of the respective first candidate entity pair based on the triplet proportion.

6. The method according to claim 1, wherein the calculating comprises:

for each of the first candidate entity pairs, determining a weight of a first entity of the respective first candidate entity pair in the first knowledge graph based on a number of triplets of entities in the first knowledge graph, and determining a weight of a second entity of the respective first candidate entity pair in the second knowledge graph based on a number of triplets of entities in the second knowledge graph;

calculating a weight of the respective first candidate entity pair based on the weight of the first entity and the weight of the second entity; and calculating an alignment difficulty degree of the respective first candidate entity pair based on the weight of the respective first candidate entity pair.

7. The method according to claim 1, wherein the obtaining the labeled alignment result of each of the first target entity pairs comprises:

for each of the first target entity pairs, displaying link information of the respective first target entity pair on the interface that includes a labeling interaction interface, the link information including at least one of entity attribute information and triplet information of the entities in the respective first target entity pair; and obtaining the labeled alignment result of the respective first target entity pair in response to a labeled alignment operation performed on the respective first target entity pair using the labeling interaction interface according to the link information of the respective first target entity pair.

8. The method according to claim 1, wherein the method further comprises, before the selecting the plurality of first candidate entity pairs, determining, for each of the first entity pairs, a predicted alignment probability of the respective first entity pair based on a first knowledge graph alignment model; and the obtaining the trained knowledge graph alignment model comprises:

training the first knowledge graph alignment model according to the predicted alignment probability and the labeled alignment result of each of the first target entity pairs to obtain a second knowledge graph alignment model; and determining the second knowledge graph alignment model as the trained knowledge graph alignment model in response to satisfying a training end condition.

9. The method according to claim 8, further comprising:

after the training, in response to the second knowledge graph alignment model not satisfying the training end condition, acquiring a second entity pair set, the second entity pair set comprising a plurality of second entity pairs, each of the second entity pairs comprising an entity in a third knowledge graph and an entity in a fourth knowledge graph and having an unlabeled alignment relationship between the entity in the third knowledge graph and the entity in the fourth knowledge graph;

determining, for each of the second entity pairs, a predicted alignment probability of the respective second entity pair based on the second knowledge graph alignment model;

selecting a plurality of second candidate entity pairs from the second entity pairs based on a predicted alignment probability of each of the second entity pairs;

calculating an alignment difficulty degree of each of the second candidate entity pairs;

selecting a plurality of second target entity pairs from the second candidate entity pairs based on the alignment difficulty degree of each of the second candidate entity pairs;

obtaining, based on second one or more operations of the interface, a labeled alignment result of each of the second target entity pairs;

training the second knowledge graph alignment model according to the predicted alignment probability and the labeled alignment result of each of the second target entity pairs to obtain a third knowledge graph alignment model; and determining the third knowledge graph alignment model as the trained knowledge graph alignment model in response to satisfying the training end condition.

10. The method according to claim 1, wherein the obtaining the trained knowledge graph alignment model comprises:

selecting a plurality of alignable entity pairs from the first entity pairs based on the predicted alignment probability of each of the first entity pairs;

determining a labeled alignment result of each of the alignable entity pairs according to a predicted alignment probability of each of the alignable entity pairs; and obtaining the trained knowledge graph alignment model according to the predicted alignment probability and the labeled alignment result of each of the first target entity pairs and the predicted alignment probability and the labeled alignment result of each of the alignable entity pairs.

11. An apparatus for training a knowledge graph alignment model, comprising:

processing circuitry configured to acquire a first entity pair set, the first entity pair set comprising a plurality of first entity pairs, each of the first entity pairs comprising an entity in a first knowledge graph and an entity in a second knowledge graph and having an unlabeled alignment relationship between the entity in the first knowledge graph and the entity in the second knowledge graph;

select a plurality of first candidate entity pairs from the first entity pairs based on a predicted alignment probability of each of the first entity pairs;

calculate an alignment difficulty degree of each of the first candidate entity pairs, the alignment difficulty degree of the respective ones of the first candidate entity pairs indicating a degree of difficulty in aligning the respective first candidate entity pair;

select a plurality of first target entity pairs from the first candidate entity pairs based on the alignment difficulty degree of each of the first candidate entity pairs;

obtain, based on first one or more operations of an interface, a labeled alignment result of each of the first target entity pairs after the selection of the plurality of first target entity pairs; and obtain a trained knowledge graph alignment model according to the predicted alignment probability and the labeled alignment result of each of the first target entity pairs.

12. The apparatus according to claim 11, wherein the processing circuitry is further configured to:

for each of the first candidate entity pairs, calculate a character similarity of the respective first candidate entity pair based on character features of the entities in the respective first candidate entity pair; and determine an alignment difficulty degree of the respective first candidate entity pair based on the character similarity.

13. The apparatus according to claim 11, wherein the processing circuitry is further configured to:

for each of the first candidate entity pairs, calculate a semantic similarity of the respective first candidate entity pair based on semantic features of the entities in the respective first candidate entity pair; and determine an alignment difficulty degree of the respective first candidate entity pair based on the semantic similarity.

14. The apparatus according to claim 11, wherein the processing circuitry is further configured to:

for each of the first candidate entity pairs, calculate an entity attribute proportion of the respective first candidate entity pair based on a number of entity attributes of the respective first candidate entity pair, a number of entity attributes of the first knowledge graph, and a number of entity attributes of the second knowledge graph; and determine an alignment difficulty degree of the respective first candidate entity pair based on the entity attribute proportion.

15. The apparatus according to claim 11, wherein the processing circuitry is further configured to:

for each of the first candidate entity pairs, calculate a triplet proportion of the respective first candidate entity pair based on a number of triplets of the entities in the first candidate entity pair, a number of triplets of entities in the first knowledge graph, and a number of triplets of entities in the second knowledge graph; and determine an alignment difficulty degree of the respective first candidate entity pair based on the triplet proportion.

16. The apparatus according to claim 11, wherein the processing circuitry is further configured to:

for each of the first candidate entity pairs, determine a weight of a first entity of the respective first candidate entity pair in the first knowledge graph based on a number of triplets of entities in the first knowledge graph, and determine a weight of a second entity of the respective first candidate entity pair in the second knowledge graph based on a number of triplets of entities in the second knowledge graph;

calculate a weight of the respective first candidate entity pair based on the weight of the first entity and the weight of the second entity; and calculate an alignment difficulty degree of the respective first candidate entity pair based on the weight of the respective first candidate entity pair.

17. The apparatus according to claim 11, wherein the processing circuitry is further configured to:

for each of the first target entity pairs, display link information of the respective first target entity pair on the interface that includes a labeling interaction interface, the link information including at least one of entity attribute information and triplet information of the entities in the respective first target entity pair; and obtain the labeled alignment result of the respective first target entity pair in response to a labeled alignment operation performed on the respective first target entity pair using the labeling interaction interface according to the link information of the respective first target entity pair.

18. The apparatus according to claim 11, wherein the processing circuitry is further configured to:

before selecting the plurality of first candidate entity pairs, determine, for each of the first entity pairs, a predicted alignment probability of the respective first entity pair based on a first knowledge graph alignment model;

train the first knowledge graph alignment model according to the predicted alignment probability and the labeled alignment result of each of the first target entity pairs to obtain a second knowledge graph alignment model; and determine the second knowledge graph alignment model as the trained knowledge graph alignment model in response to satisfying a training end condition.

19. The apparatus according to claim 18, wherein the processing circuitry is further configured to:

in response to the second knowledge graph alignment model not satisfying the training end condition, acquire a second entity pair set, the second entity pair set comprising a plurality of second entity pairs, each of the second entity pairs comprising an entity in a third knowledge graph and an entity in a fourth knowledge graph and having an unlabeled alignment relationship between the entity in the third knowledge graph and the entity in the fourth knowledge graph;

determine, for each of the second entity pairs, a predicted alignment probability of the respective second entity pair based on the second knowledge graph alignment model;

select a plurality of second candidate entity pairs from the second entity pairs based on a predicted alignment probability of each of the second entity pairs;

calculate an alignment difficulty degree of each of the second candidate entity pairs;

select a plurality of second target entity pairs from the second candidate entity pairs based on the alignment difficulty degree of each of the second candidate entity pairs;

obtain, based on second one or more operations of the interface, a labeled alignment result of each of the second target entity pairs;

train the second knowledge graph alignment model according to the predicted alignment probability and the labeled alignment result of each of the second target entity pairs to obtain a third knowledge graph alignment model; and determine the third knowledge graph alignment model as the trained knowledge graph alignment model in response to satisfying the training end condition.

20. A non-transitory computer-readable storage medium storing computer-readable instructions thereon, which, when executed by processing circuitry, cause the processing circuitry to perform a method for training a knowledge graph alignment model, the method comprising:

acquiring a first entity pair set, the first entity pair set comprising a plurality of first entity pairs, each of the first entity pairs comprising an entity in a first knowledge graph and an entity in a second knowledge graph and having an unlabeled alignment relationship between the entity in the first knowledge graph and the entity in the second knowledge graph;

selecting a plurality of first candidate entity pairs from the first entity pairs based on a predicted alignment probability of each of the first entity pairs;

calculating an alignment difficulty degree of each of the first candidate entity pairs, the alignment difficulty degree of the respective ones of the first candidate entity pairs indicating a degree of difficulty in aligning the respective first candidate entity pair;

selecting a plurality of first target entity pairs from the first candidate entity pairs based on the alignment difficulty degree of each of the first candidate entity pairs;

obtaining, based on first one or more operations of an interface, a labeled alignment result of each of the first target entity pairs after the selection of the plurality of first target entity pairs; and obtaining a trained knowledge graph alignment model according to the predicted alignment probability and the labeled alignment result of each of the first target entity pairs.

* * * * *